G. CARTASSO.
SIGNAL.
APPLICATION FILED NOV. 28, 1919.

1,410,165.

Patented Mar. 21, 1922.

Inventor
Giacomo Cartasso.
By Harry C. Schroeder
Attorney

UNITED STATES PATENT OFFICE.

GIACOMO CARTASSO, OF OAKLAND, CALIFORNIA.

SIGNAL.

1,410,165.  Specification of Letters Patent.  Patented Mar. 21, 1922.

Application filed November 28, 1919. Serial No. 341,025.

*To all whom it may concern:*

Be it known that I, GIACOMO CARTASSO, a citizen of the United States, residing at Oakland, in the county of Alameda and State of California, have invented certain new and useful Improvements in Signals, of which the following is a specification.

My invention is an improved automobile signal.

Referring to the annexed drawing which forms a part of this specification.

Figure 1:
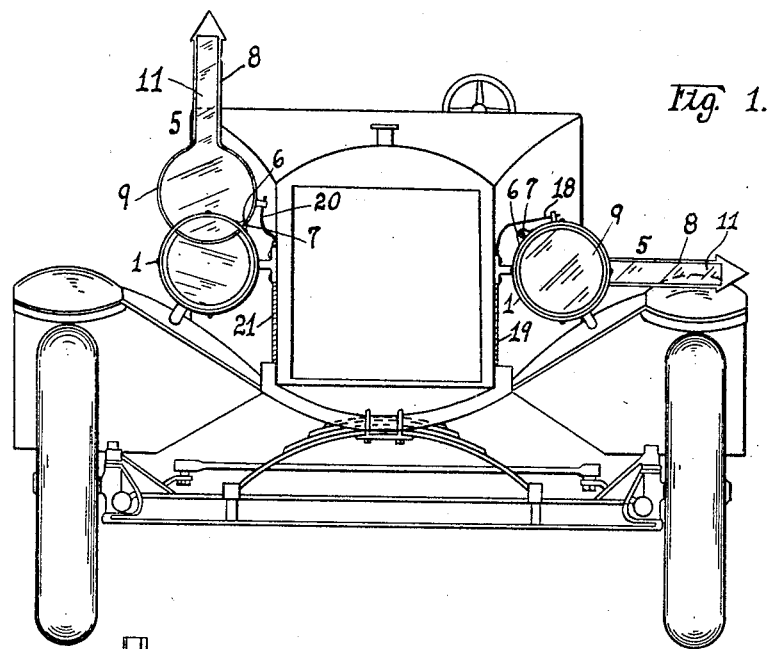
Figure 1 is a front view of an automobile and my signal mounted thereon.
Figure 2:
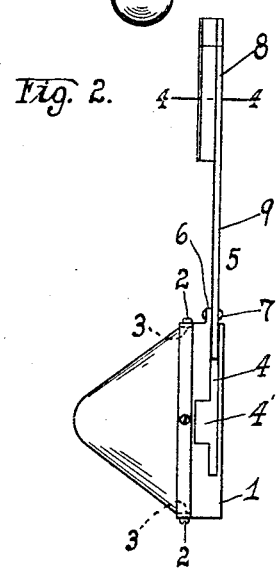
Figure 2 is a plan view of my signal.
Figure 3:
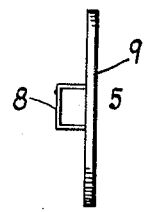
Figure 3 is an end view of my signal.
Figure 4:
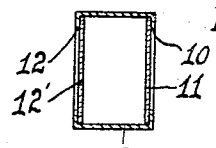
Figure 4 is a cross section of my signal taken on line 4—4 of Figure 2.
Figure 5:
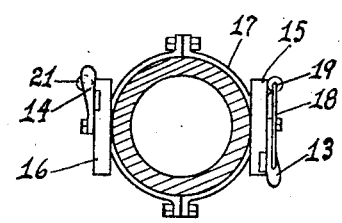
Figure 5 is a plan view of the signal actuating means.
Figure 6:
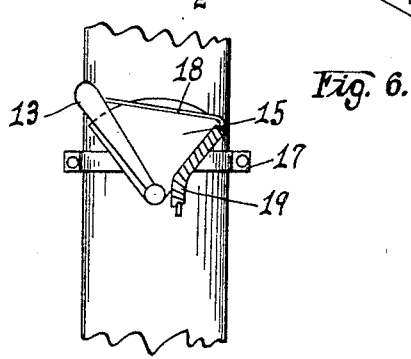
Figure 6 is a front view of the signal actuating means.
Figure 7:
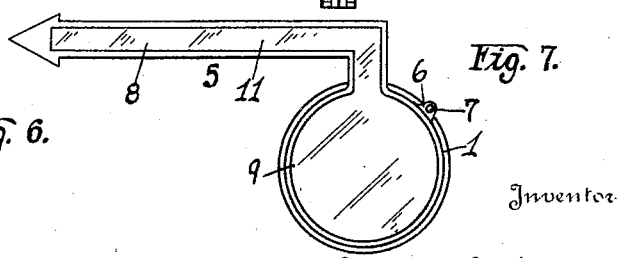
Figure 7 is a front view of a modified form of my signal.

On the front of each automobile lamp a cylindrical wall 1 is detachably secured by means of screws 2 extending through lugs 3 on the ring. In the upper and outer portion of each wall is a slot 4 which receives the inner end portion of a signal arm 5 which is pivoted to a lug 6 on top of the wall 1 by a pivot 7. The slot 4 is enlarged at 4' in the outer side of the wall. Each arm 5 includes a frame 8 in the form of an arrow with a circular member 9 at its inner end corresponding to the outline of the automobile lamp, the frame being box-shaped rearwardly from the member 9 to the outer end thereof. The frame 8 is formed with an opening 10 in the front wall thereof, the outline of said opening extending close to the outline of the frame and parallel therewith. A front red glass panel 11 is placed in the frame back of the opening 10. The frame 8 is formed with an opening 12 in its rear wall from the member 9 to the outer end thereof. A rear glass panel 12' is placed in the frame 8 forwardly of the opening 12. Two actuating levers 13 and 14 are pivoted on frames 15 and 16 respectively which are clamped by means of a clamp 17 on the left and right side of the steering post of the automobile. A flexible rod 18 extends through a tube 19 secured on the automobile and is connected at its ends to the member 9 of the left signal arm and to the lever 13. A flexible rod 20 extends through a tube 21 secured on the automobile and is connected at its ends to the member 9 of the right signal arm and to the lever 14. In the modified form of my invention shown in Figure 7 the frame 8 of the arm is offset above the member 9 thereof so that said member may be more readily seen from the rear, if the lamps are too low.

Normally the signal arms extend vertically above the automobile lamps in non-signalling position and so that the lamps may project their rays in the usual manner. In order to signal to the left or right the left or right lever 13 or 14 is swung on its pivot which through rod 18 or 20 swings the left or right signal arm down in horizontal and signalling position. In the signalling position of the arm the circular frame member 9 and the front glass panel 11 in said member rests in front of the automobile lamp causing the lamp when lighted to project a red light forwardly through said panel and a red light rearwardly through panel, the light of the lamp projecting through opening 4' into the box structure of the arm so as to project the red light forwardly and rearwardly of the arm at the side of the lamp.

Having described my invention, I claim:

1. An automobile signal including a signalling arm pivotally mounted on the automobile lamp, said arm being formed with a circular rear portion and with a box-shaped arrow extending from said circular portion, a glass panel in the front of said circular portion and said arrow, the inner end of said box-shaped arrow being open and the arm being so mounted that when swung into signalling position said circular portion will pass over and cover the face of the lamp and the light of the lamp will project into said box-shaped arrow and through said panel.

2. An automobile signal including a cylindrical wall mounted on the automobile lamp and provided with a slot in the top and outer side thereof, the slot being enlarged at the outer side of said wall, a signalling arm pivotally mounted on said wall so that its rear end portion may swing through said slot over the face of the lamp into signalling position, said arm being formed with a box shaped arrow extending from its rear end portion, the rear end of said arrow being open to register with the enlarged portion of said slot when the arm is swung into signalling position so that the light of the lamp will project into said arrow, and a glass panel covering the front of said rear end portion and the front of said arrow.

3. An automobile signal including a signalling arm pivotally mounted to swing its rear end portion over the face of the automobile lamp, a signal glass panel in said arm through which the automobile lamp projects its light forwardly to expose the signal, and a signal glass panel in said arm extending from the rear end portion thereof through which the automobile lamp projects its rays rearwardly.

4. An automobile signal including a cylindrical wall mounted on the automobile lamp and provided with a slot in the top and outer side thereof, a signal arm pivotally mounted on said wall so that its rear end portion may swing through said slot over the face of said lamp, the arm being of box formation extending from its rear end portion, signal panels in the front of the box formation structure of said arm, said cylindrical wall having an enlarged slot opening through which the rays of the lamp project into the box structure of said arm when the arm is in signalling position.

5. An automobile signal including a cylindrical wall mounted on the automobile lamp and provided with a slot in the top and outer side thereof, the slot being enlarged at the outer side of said wall, a signalling arm pivotally mounted on said wall so that its rear end portion may swing through said slot over the face of the lamp into signalling position, said arm being formed with a box shaped arrow extending from its rear end portion, the rear end of said arrow being open to register with the enlarged portion of said slot when the arm is swung into signalling position so that the light of the lamp will project into said arrow, and a glass panel covering the front of said rear end portion and the front of said arrow, and a glass panel covering the rear of said arrow.

In testimony whereof I affix my signature.

GIACOMO CARTASSO.